US010435007B2

(12) United States Patent
Follen et al.

(10) Patent No.: US 10,435,007 B2
(45) Date of Patent: Oct. 8, 2019

(54) SYSTEMS AND METHODS OF ENGINE STOP/START CONTROL OF AN ELECTRIFIED POWERTRAIN

(71) Applicant: Cummins, Inc., Columbus, IN (US)

(72) Inventors: Kenneth M. Follen, Greenwood, IN (US); Arun Prakash Thunga Gopal, Columbus, IN (US); Vivek A. Sujan, Columbus, IN (US); Pinak Jayant Tulpule, Columbus, IN (US); Mugdha S. Sane, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 321 days.

(21) Appl. No.: 15/269,428

(22) Filed: Sep. 19, 2016

(65) Prior Publication Data

US 2017/0080919 A1    Mar. 23, 2017

Related U.S. Application Data

(60) Provisional application No. 62/222,573, filed on Sep. 23, 2015.

(51) Int. Cl.
*B60W 20/12* (2016.01)
*B60W 50/00* (2006.01)
(Continued)

(52) U.S. Cl.
CPC ......... *B60W 20/12* (2016.01); *B60H 1/00778* (2013.01); *B60W 10/06* (2013.01);
(Continued)

(58) Field of Classification Search
CPC .. B60W 20/12; B60W 50/0097; B60W 10/06; B60W 10/08; B60W 10/30; B60W 2550/12; B60W 2550/142; B60W 2550/143; B60W 2550/20; B60W 2550/408; B60W 2550/402;
(Continued)

(56) References Cited

U.S. PATENT DOCUMENTS

| 7,665,559 B2 | 2/2010 | De La Torre-Bueno |
| 7,958,958 B2 | 6/2011 | De La Torre Bueno |

(Continued)

FOREIGN PATENT DOCUMENTS

| CN | 102445927 | 5/2012 |
| JP | 2012-085505 | 4/2012 |

OTHER PUBLICATIONS

USABC development of 12 volt battery for start-stop application; Harshad Tataria et al.; 2013 World Electric Vehicle Symposium and Exhibition (EVS27); pp. 1-8; year 2013.*

(Continued)

*Primary Examiner* — Cuong H Nguyen
(74) *Attorney, Agent, or Firm* — Foley & Lardner LLP

(57) ABSTRACT

Systems, apparatuses, and methods disclosed provide for receiving internal information, external static information, and external dynamic information of a hybrid vehicle, and selectively enable or disable a stop/start function for the engine of the hybrid vehicle based on the internal hybrid vehicle information, external static information, and external dynamic information. The stop/start function controls selective activation and deactivation of the engine during operation of the hybrid vehicle.

16 Claims, 3 Drawing Sheets

(51) Int. Cl.
*B60W 10/06* (2006.01)
*B60W 10/08* (2006.01)
*B60W 10/30* (2006.01)
*F02N 11/08* (2006.01)
*B60H 1/00* (2006.01)

(52) U.S. Cl.
CPC ............ *B60W 10/08* (2013.01); *B60W 10/30* (2013.01); *B60W 50/0097* (2013.01); *F02N 11/0837* (2013.01); *B60W 2550/12* (2013.01); *B60W 2550/142* (2013.01); *B60W 2550/143* (2013.01); *B60W 2550/20* (2013.01); *B60W 2550/402* (2013.01); *B60W 2550/408* (2013.01); *F02N 2200/0806* (2013.01); *F02N 2200/122* (2013.01); *F02N 2200/123* (2013.01); *F02N 2200/124* (2013.01); *F02N 2200/125* (2013.01); *Y02T 10/48* (2013.01); *Y02T 10/6291* (2013.01)

(58) Field of Classification Search
CPC ......... F02N 11/0837; F02N 2200/0806; F02N 2200/122; F02N 2200/123; F02N 2200/124; F02N 2200/125; Y02T 10/6291; Y02T 10/48
USPC ......... 701/53, 36, 112, 113, 22; 180/65.275, 180/65.21; 903/902
See application file for complete search history.

(56) References Cited

U.S. PATENT DOCUMENTS

| | | | |
|---|---|---|---|
| 8,036,785 B2 | 10/2011 | Maguire et al. | |
| 8,204,640 B2 | 6/2012 | Tani et al. | |
| 8,340,849 B2 | 12/2012 | Amano et al. | |
| 8,370,012 B2 | 2/2013 | Yamada et al. | |
| 8,374,740 B2 | 2/2013 | Druenert et al. | |
| 8,401,733 B2 | 3/2013 | Weslati et al. | |
| 8,515,607 B2 | 8/2013 | Amano et al. | |
| 8,560,155 B2 | 10/2013 | Kedar-Dongarkar et al. | |
| 8,612,082 B2 | 12/2013 | Hashimoto et al. | |
| 8,613,333 B2 | 12/2013 | Janczak et al. | |
| 8,688,299 B2* | 4/2014 | Saito | B60K 6/48 701/22 |
| 8,688,302 B2 | 4/2014 | Sujan et al. | |
| 8,751,083 B2 | 6/2014 | Huntzicker | |
| 8,751,087 B1 | 6/2014 | Dufford | |
| 8,761,981 B2 | 6/2014 | Hussain et al. | |
| 8,818,600 B2* | 8/2014 | Reed | B60W 10/02 701/22 |
| 8,839,890 B2 | 9/2014 | Caruso et al. | |
| 8,892,290 B2* | 11/2014 | Reed | B60W 10/196 701/22 |
| 8,924,061 B2* | 12/2014 | Reed | B60W 10/02 701/22 |
| 8,924,062 B2* | 12/2014 | Reed | B60W 10/02 701/22 |
| 8,930,057 B2* | 1/2015 | Otake | B60W 10/06 701/22 |
| 8,938,327 B2* | 1/2015 | Doering | B60W 10/196 701/22 |
| 8,973,690 B2 | 3/2015 | Yates et al. | |
| 9,043,106 B2 | 5/2015 | Ingram et al. | |
| 9,058,038 B2 | 6/2015 | Zhang et al. | |
| 2008/0275601 A1* | 11/2008 | Saito | B60K 6/48 701/22 |
| 2011/0246010 A1 | 10/2011 | De La Torre Bueno | |
| 2012/0010767 A1 | 1/2012 | Phillips et al. | |
| 2012/0310471 A1 | 12/2012 | Sengoku et al. | |
| 2013/0131892 A1 | 5/2013 | Hashimoto et al. | |
| 2013/0151044 A1 | 6/2013 | Lee | |
| 2013/0274952 A1 | 10/2013 | Weslati et al. | |
| 2013/0296102 A1* | 11/2013 | Banker | B60W 10/196 477/4 |
| 2013/0296119 A1* | 11/2013 | Reed | B60W 10/02 477/5 |
| 2013/0296124 A1* | 11/2013 | Pietron | B60W 20/40 477/5 |
| 2013/0297115 A1* | 11/2013 | Doering | B60K 6/48 701/22 |
| 2013/0297116 A1* | 11/2013 | Reed | B60W 10/02 701/22 |
| 2013/0297117 A1* | 11/2013 | Lee | B60W 10/196 701/22 |
| 2013/0297118 A1* | 11/2013 | Reed | B60W 10/02 701/22 |
| 2013/0297121 A1* | 11/2013 | Reed | B60W 10/02 701/22 |
| 2014/0139354 A1 | 5/2014 | Miyazaki | |
| 2014/0232356 A1 | 8/2014 | Kyoung | |
| 2015/0027837 A1 | 1/2015 | Lamba | |
| 2015/0032310 A1 | 1/2015 | Zettel et al. | |
| 2015/0066270 A1* | 3/2015 | Ogawa | B60W 20/00 701/22 |
| 2015/0066837 A1 | 3/2015 | Twarog et al. | |
| 2015/0073639 A1 | 3/2015 | Minarcin et al. | |
| 2015/0073644 A1* | 3/2015 | Reed | B60W 10/196 701/22 |
| 2015/0151736 A1 | 6/2015 | Kim | |
| 2015/0165916 A1 | 6/2015 | Kim et al. | |
| 2015/0175020 A1 | 6/2015 | Kim et al. | |
| 2015/0266469 A1* | 9/2015 | Gibson | F02N 11/006 701/22 |
| 2015/0275787 A1 | 10/2015 | Dufford et al. | |
| 2015/0275788 A1 | 10/2015 | Dufford et al. | |
| 2015/0336458 A1 | 11/2015 | Lee et al. | |
| 2015/0353069 A1* | 12/2015 | Lee | B60W 10/196 701/22 |
| 2016/0031339 A1 | 2/2016 | Geo | |
| 2016/0046278 A1 | 2/2016 | Matsuzaki et al. | |
| 2016/0052420 A1 | 2/2016 | Kim | |
| 2016/0107634 A1 | 4/2016 | Kim et al. | |
| 2016/0114787 A1 | 4/2016 | Yang et al. | |
| 2016/0129918 A1 | 5/2016 | Skaff et al. | |
| 2017/0080923 A1* | 3/2017 | Johri | B60K 6/442 |
| 2018/0222309 A1* | 8/2018 | Follen | B60K 6/48 |
| 2018/0257473 A1* | 9/2018 | Follen | B60K 6/20 |
| 2018/0273018 A1* | 9/2018 | Follen | B60W 10/30 |

OTHER PUBLICATIONS

Online Energy Management for Hybrid Electric Vehicles; John T. B. A. Kessels et al.; EEE Transactions on Vehicular Technology Year: 2008, vol. 57, Issue: 6; pp. 3428-3440.*

Reduction Design of Vibration and Noise in IPMSM Type Integrated Starter and Generator for HEV; Jae-Woo Jung et al.; IEEE Transactions on Magnetics; Year: 2010, vol. 46, Issue: 6; pp. 2454-2457.*

* cited by examiner

SYSTEMS AND METHODS OF ENGINE STOP/START CONTROL OF AN ELECTRIFIED POWERTRAIN

CROSS-REFERENCE TO RELATED APPLICATIONS

This application claims the benefit of U.S. Provisional Patent Application No. 62/222,573, filed Sep. 23, 2015, entitled "SYSTEMS AND METHODS OF ENGINE STOP/START CONTROL OF AN ELECTRIFIED POWERTRAIN," which is incorporated herein by reference in its entirety.

TECHNICAL FIELD

The present disclosure relates to systems and methods of engine stop/start control of powertrain systems for a vehicle.

BACKGROUND

In a vehicle, the powertrain or powertrain system refers to the components that provide the power to propel the vehicle. These components include the engine, transmission, the drive/propeller shaft, differentials, and a final drive. In operation and for an internal combustion engine, the engine combusts a fuel to generate mechanical power in the form of a rotating crankshaft. The transmission receives the rotating crankshaft and manipulates the engine speed (i.e., the rotation of the crankshaft) to control a rotation speed of the drive/propeller shaft, which is also coupled to the transmission. The rotating drive shaft is received by a differential, which transmits the rotational power to a final drive (e.g., wheels) to effect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel).

In regard to a hybrid vehicle, conventional hybrid engine systems generally include both an electric motor and an internal combustion engine that are capable of powering the drivetrain in order to propel the car. A hybrid vehicle can have various configurations. For example, in a parallel configuration both the electric motor and the internal combustion engine are operably connected to the drivetrain/transmission to propel the vehicle. In a series configuration, the electric motor is operably connected to the drivetrain/transmission and the internal combustion engine indirectly power the drivetrain/transmission by powering the electric motor.

During travel of a vehicle, there are many instances when the vehicle may stop before the destination is reached. This may occur, for example, when the vehicle stops at traffic lights, cross-walks, stop signs and the like. A vehicle with an electrified powertrain may enable a stop/start function for starting and stopping the vehicle engine during a driving event. For example, the engine is shut down if no power is required (e.g., while waiting at a traffic light). A battery of the vehicle may satisfy the vehicle's entire electrical needs when the engine is off. As soon as power is requested (e.g., when the driver releases the brake pedal), the engine is automatically restarted. By avoiding unnecessary engine idling, the vehicle's fuel economy may be improved. For this reason, it is desirable to use the engine stop/start function as much as possible when certain engine stop conditions are satisfied.

For a vehicle that is temporarily stopped on a hill, the engine or motor must work to maintain just enough torque to hold the vehicle from rolling backwards. This is known as a "hill hold." When operating under this condition, the motor will use energy stored in the battery. If the engine is shut down, the battery will alone provide the torque needed and the battery life will be negatively affected. In addition, there are other situations where the engine is desired to work during a temporary stop of the vehicle, for example, in the situation of power steering or when heating, ventilating, and air conditioning (HVAC) is on. Further, in many stop-and-go situations or vehicle creep situations (e.g., as commonly experienced during heavy traffic), vehicles do not remain stopped long enough to effectively implement the start-stop feature. During these stop-and-go situations, the repeated restarting of the engine may cause excess battery drain. Accordingly, an engine stop/start control system is desired that minimizes the power loss due to engine idling while also avoids overconsuming the battery.

SUMMARY

One embodiment relates to an apparatus. The apparatus includes an internal information module structured to receive internal information regarding operation of a hybrid vehicle; an external static information module structured to receive external static information for a route of the hybrid vehicle, wherein the external static information is based on a position of the hybrid vehicle on the route; an external dynamic information module structured to receive external dynamic information for the route of the hybrid vehicle, wherein the external dynamic information is based on the position and a time of travel of the hybrid vehicle at the position; and an engine stop/start module communicably coupled to each of the internal information module, the external static information module, and the external dynamic information module, wherein the engine stop/start module is structured to selectively enable and disable a stop/start function for the engine of the hybrid vehicle based on at least one of the internal information, the external static information, and the external dynamic information, wherein the stop/start function controls selective activation and deactivation of the engine during operation of the hybrid vehicle.

Another embodiment relates to a method. The method includes receiving, by a controller of a hybrid vehicle, internal hybrid vehicle information, external static information, and external dynamic information; and selectively enabling or disabling a stop/start function for the engine of the hybrid vehicle based on at least one of the internal information, the external static information, and the external dynamic information, wherein the stop/start function controls selective activation and deactivation of the engine during operation of the hybrid vehicle.

Yet another embodiment relates to a system. The system includes an engine, and a controller communicably and operatively coupled to the engine. According to one embodiment, the controller is structured to: receive at least one of the internal information, external static information, and external dynamic information; and, selectively enable and disable a stop/start function for the engine based on at least one of the internal information, the external static information, and the external dynamic information, wherein the stop/start function controls selective activation and deactivation of the engine.

These and other features, together with the organization and manner of operation thereof, will become apparent from

DETAILED DESCRIPTION OF VARIOUS EMBODIMENTS

Figure 1:
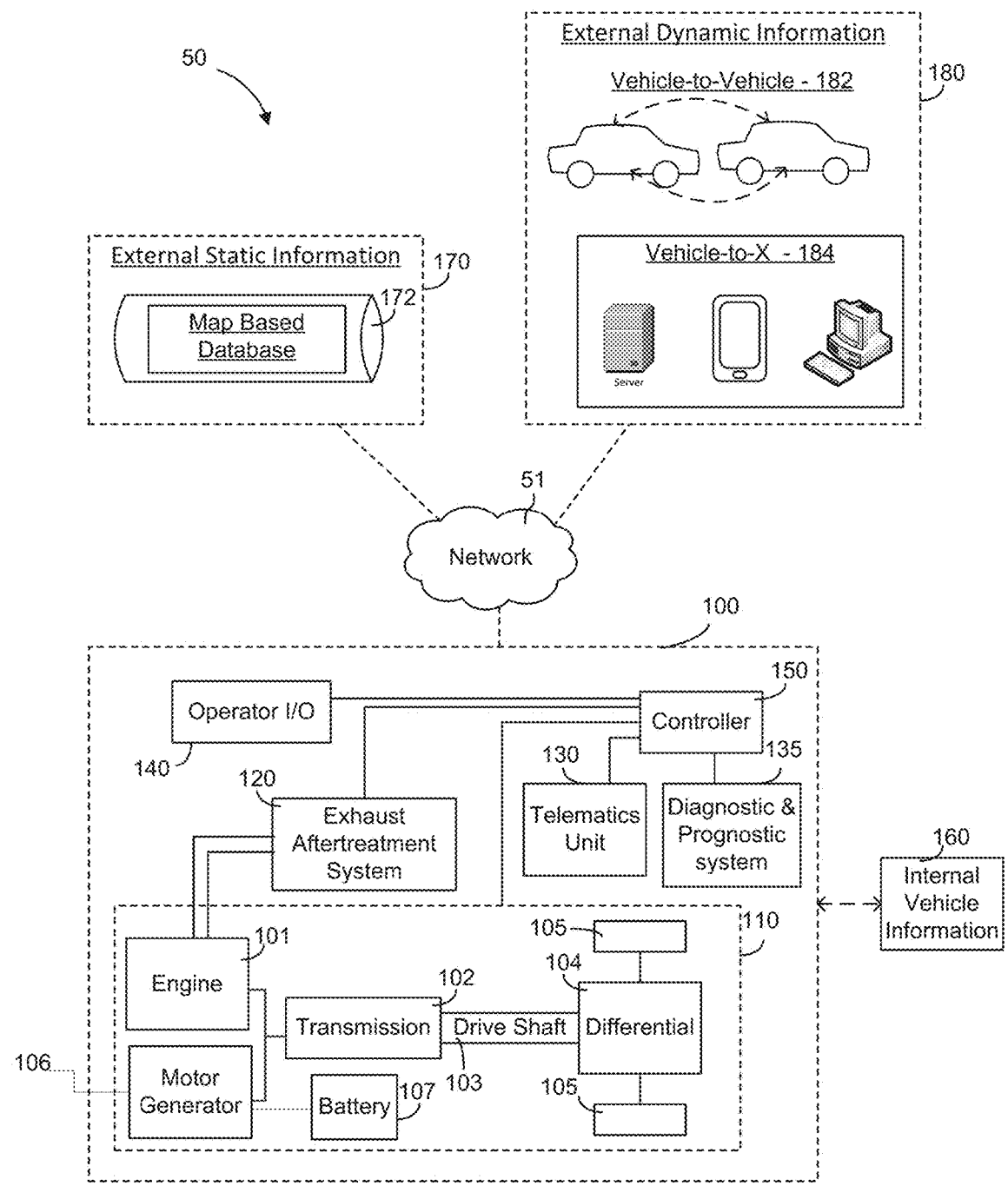
FIG. 1 is a schematic diagram of an intelligent transportation system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods of engine stop/start control based on internal vehicle information, static external vehicle information (e.g., information that may change with distance but not with time), and dynamical external vehicle information (e.g., information that may change with time and distance) for at least a partial hybrid vehicle (e.g., a vehicle that has an electrified powertrain). According to the present disclosure, a controller may be communicably coupled with one or more external data providing sources (e.g., a telematics system provider, another vehicle via a Vehicle-to-Vehicle network, a Vehicle-to-X network, etc.), such that the controller may receive data and have a knowledge of one or more upcoming conditions for the vehicle. Based on these conditions, the controller may determine whether the engine is desired to work during a temporary stop of the vehicle. In response, the controller may selectively disable or enable a stop/start function or feature for the engine. For example, the controller may receive data indicating that the vehicle is traveling on an uphill grade and in response determine to disable the stop/start function so that the engine can contribute the torque needed for traversing the uphill grade. In another example, the controller may receive data indicative of an upcoming hill and in response plan on disabling the stop/start function at the location of the hill. In a further example, the controller may receive data indicating of an upcoming turn where power steering is needed and in response disable the stop/start function. In still a further example, the controller may receive data indicative of traffic conditions (e.g., traffic lights, stop sign, etc.) and in response disable or enable the stop/start function. In yet another example, the controller may receive data indicative of ambient weather conditions (e.g., ambient temperature) and in response disable or enable the stop/start function. In this regard and beneficially, the systems, methods, and apparatuses may avoid the over consumption of the battery life while at the same-time power loss due to engine idling may be minimized.

As used herein, the phrase "state of charge" (SOC) refers to the charge level of the battery (i.e., a current battery capacity versus the maximum battery capacity, usually expressed as a percentage). As also used herein, the phrase "battery life" refers to a cycle life of a battery (i.e., how many charge-discharge cycles a battery can endure before not satisfying specific performance criteria). Specific performance criteria (e.g., battery capacity, and/or state of health (SOH)) may include any predefined acceptable operating range for the battery. As used herein, "battery capacity" refers to the amount of charge a battery can deliver for a specific amount of time (expressed in ampere-hours). For example, a 100 ampere-hours capacity refers to a battery that can deliver 5 amperes for 20 hours (5 amperes*20 hours=100 ampere-hours). For example, a battery that is only capable of 75 ampere-hours from its original 100 ampere-hours may be deemed to not meet the minimum performance criteria of 80 ampere-hours. Also, as used herein, the phrase "state of health" (SOH) refers to the current state of battery life. In other words, the SOH refers to the amount of charge a battery can hold (typically, expressed as a percentage in relation to an original amount of charge capacity of the battery). The acceptable performance criteria may be defined in regard to other variables and/or characteristics of the battery as well.

Referring now generally to FIG. 1, a schematic diagram of an intelligent transportation system is shown according to one embodiment. The intelligent transportation system (ITS) 50 is structured to provide an environment that facilitates and allows the exchange of information or data (e.g., communications) between a vehicle, such as vehicle 100, and one or more other components or sources. In this regard and for example, the ITS 50 may include telematics systems that facilitate the acquisition and transmission of data acquired regarding the operation of the vehicle 100. As shown and generally speaking, the ITS 50 includes a vehicle 100 communicably coupled via a network 51 to each of an external static information source 170 and an external dynamic information source 180, where the term "external" refers to a component or system outside of the vehicle 100. The information/data may be stored inside or outside of the vehicle 100.

The network 51 may be any type of communication protocol that facilitates the exchange of information between and among the vehicle 100 and the external static and dynamic information sources 170 and 180. In this regard, the network 51 may communicably couple the vehicle 100 with each of the external static and dynamic information sources 170 and 180. In one embodiment, the network 51 may be configured as a wireless network. In this regard, the vehicle 100 may wirelessly transmit and receive data from at least one of the external static and dynamic information sources 170 and 180. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 150 and/or telematics unit 130 of the vehicle 100 may electrically, communicably, and/or operatively couple via fiber optic cable to the network 51 to selectively transmit and receive data wirelessly to and from at least one of the external static and dynamic information sources 170 and 180.

The external static information source 170 may be any information provider capable of providing external static information, where external static information refers to information or data (e.g., value, etc.) that may vary as a function of position (e.g., the grade of the road may vary along a route) but is substantially unchanging with respect to time. In this regard, the external static information source 170 may include one or more map based databases 172, where the map based database 172 includes static information including, but not limited to, road grade data (e.g., the road grade at various spots along various routes), speed limit data (e.g., posted speed limits in various road locations), elevation or altitude data at various points along a route, curvature data at various points along a route, location of intersections along a route, etc. It should be understood that the present disclosure contemplates other sources of external static information (e.g., a global positioning system satellite that provides latitude, longitude, and/or elevation data), such that the database configuration is not meant to be limiting or intended to be the only type of static information source contemplated.

The external dynamic information source 180 may be any external dynamic information provider, where external dynamic information refers to information or data (e.g., values, etc.) that may vary as a function of both time and location (e.g., construction speed limits). In this regard, the external dynamic information source 180 may include any source capable of providing the external dynamic information. Accordingly, the external dynamic information source 180 may include vehicle-to-vehicle 182 communications. In this regard, the vehicle 100 may communicate with one or more other vehicles directly (e.g., via NFC, etc.) to obtain data regarding one or more upcoming conditions for the vehicle 100. In another embodiment, the external dynamic information source 182 may include a vehicle-to-X 184 configuration, where the "X" refers to any remote information providing source. For example and as shown in FIG. 1, the remote information providing source may include one or more servers, computers, mobile devices, infrastructure components, etc. Accordingly, the external dynamic information may include, but is not limited to, a traffic density at a particular location at a particular time, a weather condition at a particular location at a particular time, etc. Like the external static information sources 170, it should be understood that the present disclosure contemplates other sources of external dynamic information sources, such that the depicted examples are not meant to be limiting or intended to be the only type of dynamic information source contemplated.

Referring now to the vehicle 100 of FIG. 1, the vehicle 100 is communicably coupled with each of the external static and dynamic sources 170, 180 via the network 51. In the embodiment depicted, the vehicle 100 is structured as a hybrid vehicle having an internal combustion engine 101 power source and a motor/generator 106 power source. The vehicle 100 may be configured as any type of hybrid-powered vehicle (e.g., a full electric vehicle, a plug-in hybrid vehicle, etc.). As such, the vehicle 100 may be configured as an on-road or an off-road vehicle including, but not limited to, line-haul trucks, mid-range trucks (e.g., pick-up truck), tanks, airplanes, and any other type of vehicle that utilizes a transmission. Before delving into the particulars of the ITS 50 in regard to the vehicle 100, the various components of the vehicle 100 may be described as follows. The vehicle 100 is shown to generally include a powertrain system 110, an exhaust aftertreatment system 120, a telematics unit 130, a diagnostic and prognostic system 135, an operator input/output (I/O) device 140, and a controller 150, where the controller 150 is communicably coupled to each of the aforementioned components.

The powertrain system 110 facilitates power transfer from the engine 101 and/or motor generator 106 to power and/or propel the vehicle 100. The powertrain system 110 includes an engine 101 and a motor generator 106 operably coupled to a transmission 102 that is operatively coupled to a drive shaft 103, which is operatively coupled to a differential 104, where the differential 104 transfers power output from the engine 101 and/or motor generator 106 to the final drive (shown as wheels 105) to propel the vehicle 100. In this regard, the powertrain system 110 is structured as an electrified powertrain. The electrified powertrain includes the motor generator 106, where the motor generator 106 may include a torque assist feature, a regenerative braking energy capture ability, a power generation ability, and any other feature of motor generators used in hybrid vehicles. In this regard, the motor generator 106 may be any conventional motor generator that is capable of generating electricity and produce a power output to drive the transmission 102. The motor generator 106 may include one or more power conditioning devices such as an inverter and motor controller, where the motor controller may be operationally and communicably coupled to the controller 150. The electrified powertrain may also include any one or more of several electrified accessories including, but not limited to, an electrically driven/controlled air compressor, an electrically driven/controlled engine cooling fan, an electrically driven/controlled heating venting and air conditioning system, an alternator, etc., where the controllability may stem from the controller 150. It should be understood that the present disclosure contemplates any and all other types of electrically-powered accessories that may be a part of the powertrain system 110 and/or separate from the powertrain system 110 but included in the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor generator 106 may be in a power receiving relationship with an energy source, such as battery 107 that provides an input energy (and stores generated electrical energy) to the motor generator 106 for the motor generator 106 to output in form of useable work or energy to in some instances propel the vehicle 100 alone or in combination with the engine 101. In this configuration, the hybrid vehicle 100 has a parallel drive configuration. However, it should be understood, that other configuration of the vehicle 100 are intended to fall within the spirit and scope of the present disclosure (e.g., a series configuration and non-hybrid applications, such as a full electric vehicle, etc.). As a result of the power output from at least one of the engine 101 and the motor generator 106, the transmission 102 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, although termed a 'motor generator' 106 throughout the pages of the disclosure, thus implying its ability to operate as both a motor and a generator, it is contemplated that the motor generator component, in some embodiments, may be an electric generator separate from the electric motor of the hybrid vehicle 100. Furthermore, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

Moreover, the battery 107 may be configured as any type of rechargeable (i.e., primary) battery and of any size. That is to say, the battery 107 may be structured as any type of electrical energy storing and providing device, such as one or more capacitors (e.g., ultra capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 150 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc.

As also shown, the vehicle 100 includes an exhaust aftertreatment system 120 in fluid communication with the engine 101. The exhaust aftertreatment system 120 receives the exhaust from the combustion process in the engine 101 and reduces the emissions from the engine 101 to less environmentally harmful emissions (e.g., reduce the NOx amount, reduce the emitted particulate matter amount, etc.). The exhaust aftertreatment system 120 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor). It should be understood that other embodiments may exclude an exhaust aftertreatment system and/or include different, less than, and/or additional components than that listed above. All such variations are intended to fall within the spirit and scope of the present disclosure.

The vehicle 100 is also shown to include a telematics unit 130. The telematics unit 130 may be structured as any type of telematics control unit. Accordingly, the telematics unit 130 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 130 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 130 may also include a communications interface for communicating with the controller 150 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 150 and the telematics unit 130. In other embodiments, a local area network (LAN), a wide area network (WAN), or an external computer (for example, through the Internet using an Internet Service Provider) may provide, facilitate, and support communication between the telematics unit 130 and the controller 150. In still another embodiment, the communication between the telematics unit 130 and the controller 150 is via the unified diagnostic services (UDS) protocol. All such variations are intended to fall within the spirit and scope of the present disclosure.

The vehicle 100 is also shown to include a diagnostic and prognostic system 135. The diagnostic and prognostic system 135 may be configured as any type of diagnostic and prognostic system. Accordingly, the diagnostic and prognostic system 135 may be communicably coupled to one or more sensors, physical or virtual, positioned throughout the vehicle 100 such that the diagnostic and prognostic system 135 may receive date indicative of one or more fault conditions, potential symptoms, operating conditions to determine a status of a component (e.g., healthy, problematic, malfunctioning, etc.). If the diagnostic and prognostic system 135 detects a fault, the diagnostic and prognostic system 135 may trigger, activate, or otherwise cause activation of a fault code and provide an indication to the operator input/output device 140 of the vehicle (e.g., a check engine light, etc.).

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission, a cruise control input setting, etc. Via the input/output device 140, the operator can designate preferred characteristics of one or more vehicle parameters.

As shown, the controller 150 is communicably coupled to the powertrain system 110, the exhaust aftertreatment system 120, the telematics unit 130, the diagnostic and prognostic system 135, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., instructions, commands, signals, values, etc.) from one or more of the components shown in FIG. 1. This may generally be referred to as internal vehicle information 160 (e.g., data, values, etc.). The internal vehicle 160 information represents determined, acquired, predicted, estimated, and/or gathered data regarding one or more components in the vehicle 100.

Accordingly, the internal vehicle information 160 may include data regarding the road situation the vehicle 100 is experiencing, for example, the instantaneous road grade. The internal vehicle information 160 may also include data regarding the battery 107. As mentioned above, the data regarding the battery 107 may include, but is not limited to, a temperature of the battery, a current into or out of the battery, a number of charge-discharge cycles, a battery voltage, a battery state of charge, etc. The internal vehicle information 160 may also include information from the diagnostic and prognostic system 135, which may include, but is not limited to, one or more fault codes, data identifiers, diagnostic trouble codes, and so on. The internal vehicle information 160 may also include data regarding the motor generator 106. Data regarding the motor generator 106 may include, but is not limited to, a power consumption rate, a power output rate, an hours of operation amount, a temperature, etc. The internal vehicle information 160 may also include other data regarding the powertrain system 110 (and other components in the vehicle 100). For example, the data regarding the powertrain system 110 may include, but is not limited to, the vehicle speed, the current transmission gear/setting, the load on the vehicle/engine, the throttle position, a set cruise control speed, data relating to the exhaust aftertreatment system 120, output power, engine speed, fluid consumption rate (e.g., fuel consumption rate, diesel exhaust fluid consumption rate, etc.), any received engine/vehicle faults (e.g., a fault code indicating a low amount of diesel exhaust fluid), engine operating characteristics (e.g., whether all the cylinders are activated or which cylinders are deactivated, etc.), etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst).

The internal vehicle information may be stored by the controller 150 and selectively transmitted to one or more desired sources (e.g., another vehicle such as in a vehicle-to-vehicle communication session, a remote operator, etc.). In other embodiments, the controller 150 may provide the internal vehicle information 160 to the telematics unit 130 whereby the telematics unit transmits the internal vehicle information 160 to one or more desired sources (e.g., a remote device, an operator of the telematics unit, etc.). All such variations are intended to fall within the spirit and scope of the present disclosure.

In this regard because the components of FIG. 1 are shown to be embodied in a vehicle 100, the controller 150 may be structured as an electronic control module (ECM). The ECM may include a transmission control unit and any other control unit included in a vehicle (e.g., exhaust aftertreatment control unit, engine control module, powertrain control module, etc.). In other embodiments, the controller 150 may be its own ECM. All such variations are intended to fall within the scope of the present disclosure. The function and structure of the controller 150 are shown described in greater detail in FIG. 2.

Figure 2:
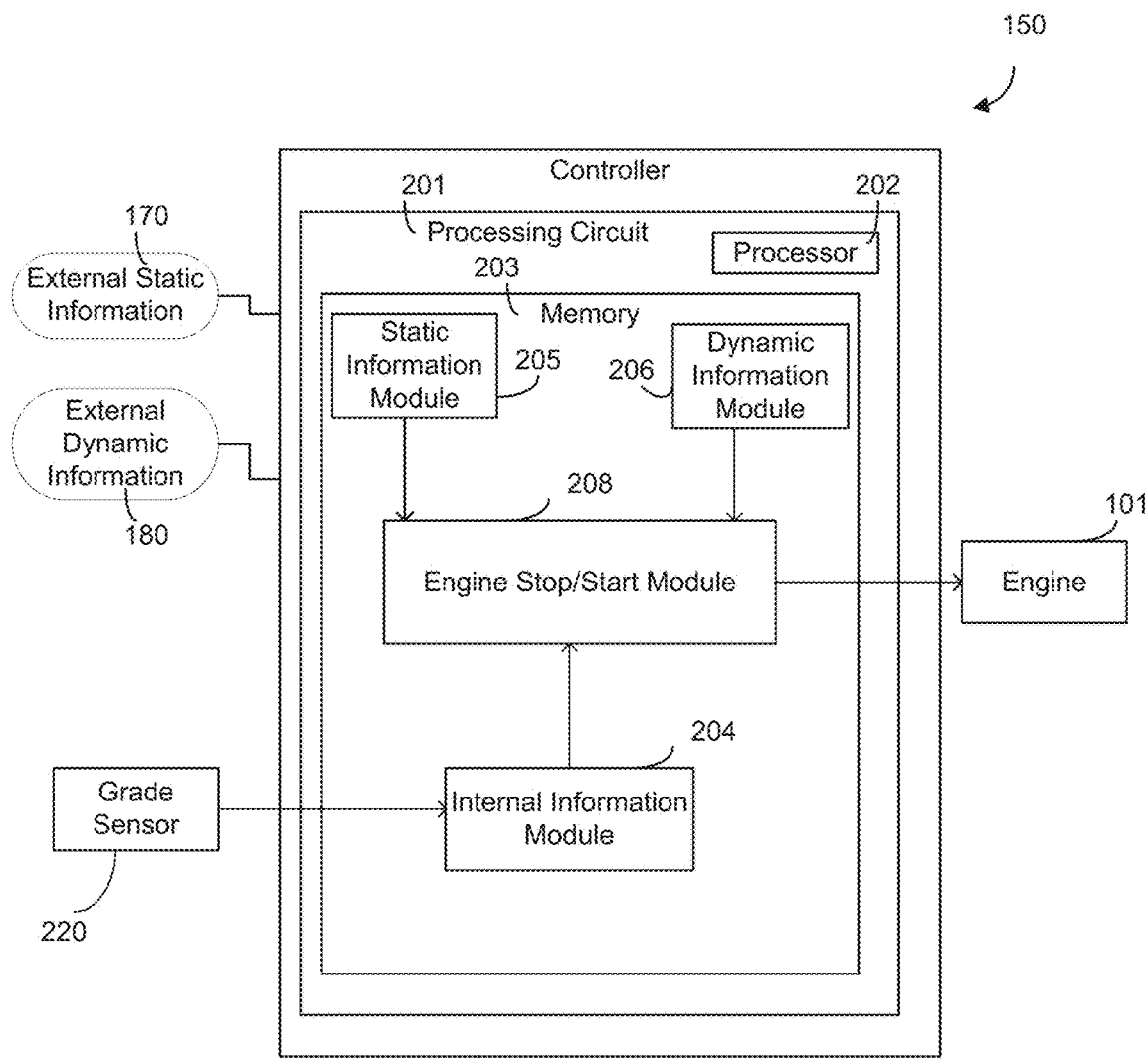
FIG. 2 is a schematic diagram of the controller used with the vehicle of FIG. 1, according to an example embodiment.

Accordingly, referring now to FIG. 2, the function and structure of the controller 150 are shown according to one example embodiment. The controller 150 is shown to include a processing circuit 201 including a processor 202 and a memory 203. The processor 202 may be implemented as a general-purpose processor, an application specific integrated circuit (ASIC), one or more field programmable gate arrays (FPGAs), a digital signal processor (DSP), a group of processing components (e.g., two or more processors and memory devices and any other processing components), or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the controller 150 and provide computer code or instructions to the controller 150 for executing the processes described in regard to the controller 150 herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various modules for completing the activities described herein. More particularly, the memory 203 includes an internal information module 204, a static information module 205, and a dynamic information module 206, all of which are communicably coupled to an engine stop/start control module 208. While various modules with particular functionality are shown in FIG. 2, it should be understood that the controller 150 and memory 203 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The internal information module 204 is structured to receive, gather, and/or acquire internal vehicle information. In one embodiment, the internal information module 204 is structured to receive instantaneous road grade information from a grade sensor 220 installed in the vehicle. In one embodiment, the internal information module 204 includes communication circuitry for facilitating reception of the internal information. In still another embodiment, the internal information module 204 includes machine-readable content for receiving and storing the internal information. In yet another embodiment, the internal information module 204 includes any combination of data acquisition devices, communication circuitry, and machine readable content. As mentioned above, the internal information may include any type of internal information regarding the vehicle 100 and from the vehicle 100 itself (e.g., an instantaneous road grade, a vehicle speed, a load on the vehicle, a torque output, a transmission setting, an engine temperature, one or more fault codes or a history of fault codes, etc.). The internal information module 204 is structured to provide the acquired and/or gathered internal information to the engine stop/start module 208.

The static information module 205 is structured to receive, gather, and/or acquire external static information 170 from one or more external static information sources (e.g., the map database 172) and provide or transmit the external static information to the engine stop/start module 208. The static information module 205 may also store the received external static information, where the storage configuration may be variable from application-to-application (e.g., store external static information for the past thirty days, etc.). In this regard, the static information module 205 may correlate various pieces of static information with frequently traveled routes for the vehicle 100 in order to facilitate fast retrieval and use. For example, if an operator frequently travels (e.g., once a month) from Wisconsin to Florida, the static information may include toll locations, intersections, speed limits, road grade, etc. for various parts along the route. Advantageously, this information may be recalled by the static information module 205 to provide to the engine stop/start module 208 on-demand. As mentioned above, the static information may include any piece of information or data that is static in nature (e.g., unchanging with respect to location, such as the road grade, curvature, intersection, and turn at a various location). Accordingly, the static information module 205 may include communication circuitry or other communication devices that facilitate the acquisition and reception of the external static information 170. In another embodiment, the static information module 205 may include machine readable content for facilitating the acquisition and reception of the external static information 170. In yet another embodiment, the static information module 205 may include any combination of hardware (e.g., communication components) and machine-readable content.

The dynamic information module 206 is structured to receive, acquire, and/or gather external dynamic information 180 from one or more external dynamic information sources (e.g., a remote device, another vehicle, an infrastructure component, etc.). As mentioned above, the external dynamic information 180 may include any information or data that may change with respect to time and distance (e.g., traffic condition, weather conditions such as temperature, etc.). In response, the dynamic information module 206 is structured to transmit or provide the received external dynamic information 180 to the engine stop/start module 208. Similar to the static information module 205, the dynamic information module 206 may include one or more configurability options that dictate how long various pieces of dynamic information are stored. For example, the wind speed may be measured at a certain rate at a certain time and location, which is stored by the dynamic information module 206. The dynamic information module 206 may update the stored wind speed upon a manual update from the operator (e.g., a refresh input received via the I/O device 140) and/or upon a configuration that dictates or defines how often the dynamic data is provided to the controller 150. This may change as the vehicle is operated. In regard to the above example, the wind speed may be different at different times at the same location along the route from Wisconsin to Florida. Other examples of external dynamic information includes traffic conditions, average speeds of vehicles on the road, detection of stop-go traffic, ambient temperature, etc. Accordingly, the dynamic information module 206 is structured to update or trigger an update by sending an alert to the dynamic external information source in advance of the vehicle travelling a certain location. Like the static information module 205, the dynamic information module 206 may include communication circuitry (e.g., relays, wiring, etc.) or other communication devices that facilitate the acquisition and reception of the external dynamic information 180. In another embodiment, the dynamic information module 206 may include machine readable content for facilitating the acquisition and reception of the external static information 180. In yet another embodiment, the dynamic information module 206 may include any combination of hardware (e.g., communication components) and machine-readable content.

In regard to either the external dynamic information or the external static information, both pieces may be received by each respective module 205 and 206 in advance of the vehicle 100 traveling a route or reaching a location. For example, if an operator designates a route for the vehicle 100, then the modules 205 and 206 may provide requests to the external static and dynamic information sources to receive the data at various points along the route. The external dynamic information may be periodically updated to account for changing conditions. If the operator does not designate a route, the modules 205 and 206, based on the current location and direction of travel of the vehicle 100, may utilize a relatively smaller window to request static and dynamic external information for locations/spots/positions that the vehicle 100 is likely to encounter. For example, if the operator is on a road with no turn-offs for two miles, the modules 205 and 206 can request dynamic and static external information for those two miles because the controller 150 may determine that the vehicle 100 must continue on this path. If the vehicle is in a busy area in a metropolitan area where one of several different routes may be traversed at any moment, the modules 205 and 206 may employ a region or zone of interest for acquiring external static and dynamic information (e.g., a two square mile radius or any predefined radius about the vehicle). The received data may then be correlated or associated with wherever the operator chooses to direct the vehicle 100 within that two square mile zone of interest. This zone of interest may then move with the vehicle 100. Of course, it should be understood that the present disclosure contemplates other techniques, methods, and strategies that may be used to control the frequency of external dynamic and static data providing based on location, such that all possible strategies are intended to fall within the spirit and scope of the present disclosure.

Turning now to the engine stop/start module 208, as shown, the engine stop/start module is structured to receive the internal information, external static information, and external dynamic information from each of the internal information module 204, static information module 205, and dynamic information module 206, respectively. In response, the engine stop/start module 208 is structured to selectively enable/disable the stop/start function for the engine 101. The stop/start function controls selective activation and deactivation of the engine 101 during operation of the hybrid vehicle 100 (i.e., turning the engine on or off). The start-stop function may stop the engine 101 during periods of expected extended idling (e.g., while the vehicle is stopped at a stop light) to conserve fuel. As discussed in further detail below, the engine stop/start module 208 may enable the start-stop feature based on, for example, predicting an extended idling by the engine 101 period by analyzing the route characteristics. When the stop/start function is disabled, instead of being turned off, the engine 101 may idle when the vehicle is motionless. The engine stop/start module 208 may disable the start-stop function during the hill hold situations, the power steering situations, or during detected creep or short stop-and-go situations, such as those experienced during heavy traffic. During these situations, although the vehicle 100 may stop for short periods of time, the engine 101 may be desired to work in order to avoid excess battery drain due to overconsumption of the battery 107 or repeated restarting of the engine 101. Accordingly, the engine stop/start module 208 is structured to identify these situations and to disable the start-stop function during these identified situations. In an embodiment, the engine stop/start control module 208 includes communication circuitry to provide one or more commands to the engine 101. In yet another embodiment, the engine stop/start control module 208 includes machine-readable content for facilitating the reception and provision of various commands to control the engine 101.

The engine stop/start control module 208 may utilize the internal information from module 204 (e.g., the instantaneous road grade) to decide whether to enable or disable the stop/start function for the engine 101. For example, when the vehicle 100 is stopped on a uphill, the grade sensor detects 220 that the instantaneous road grade is 7 percent (or another predefined value indicative of an uphill grade—of course, the "uphill grade predefined value" is highly configurable and may vary from application-to-application). The engine stop/start control module 208 receives the data of the instantaneous road grade from the internal information module 204 and compares the data to a predetermined road grade threshold (e.g., 5 percent). The predetermined grade threshold may vary with the load of the vehicle 100. In responsive to the determination that the instantaneous road grade exceeds the threshold, the engine stop/start control module 208 disables the stop/start function for the engine 101. As a result, the engine 101 may work alone or together with the motor 106 to maintain enough torque to hold the vehicle from rolling backwards. Were the stop/start function not disabled, the motor alone would have to contribute to the needed torque and the battery 107 would be or likely would be over consumed.

The engine stop/start control module 208 may also determine, estimate, and/or predict a likely upcoming road grade the vehicle 100 will be experiencing and planning on disabling the stop/start function accordingly. For example, the static information may indicate that in 0.5 miles, the road transitions from a relatively flat grade to a 7 percent grade uphill based on GPS location information and/or map based database. The engine stop/start control module 208 receives the data of the upcoming road grade and the distance from the static information module 205 and compares the upcoming road grade to a predetermined road grade threshold (e.g., 5 percent). In response to the determination that the instantaneous road grade exceeds the threshold, the engine stop/start control module 208 plans on disabling the stop/start function for the engine 101 at the uphill spot. For example, the engine stop/start control module 208 may disable the stop/start function in advance when the vehicle is within a predetermined distance (e.g., 0.5 mile) to the uphill spot. Or, the engine stop/start control module 208 may hold off until the GPS information indicates that the vehicle reaches the uphill spot.

The engine stop/start control module 208 may also receive data of a potential turn the vehicle 100 will be experiencing and in response disables the stop/start function. For example, the vehicle 100 is stopped at an intersection and the GPS indicates that the vehicle is on a turning lane (e.g., left-turn lane, right-turn lane). The engine stop/start control module 208 then decides whether the driver will need to use the steering wheel based on the road topology. In response to determining that power steering is needed, the engine stop/start control module 208 will disable the stop/ start function for the engine 101. As a result, the engine 101 will work alone or together with the motor 106 to provide torque needed for power steering.

The engine stop/start control module 208 may also receive data indicative of traffic conditions and in response enables/disables the stop/start function. For example, the vehicle 100 is stopped at an intersection and the external dynamic information indicates that the traffic light is red. The engine stop/start module 208 then enables the stop/start function for the engine 101 because the stop at a traffic light might last tens of seconds. Enabling the stop/start function will save the power from engine idling. In another example, stop of the vehicle 100 at the intersection is due to a stop sign (for example, a four-way stop sign). The external dynamic information further indicates that there are no vehicles at the other three sides of the four-way intersection. The engine stop/start control module 208 may then disable the stop/start function for the engine 101 because the vehicle will move (i.e., start traveling, change locations, etc.) very shortly (e.g., in a few seconds). In a further example, received data may indicate a heavy traffic, and the engine stop/start control module 208 may disable the stop/start function to avoid repeated restarting of the engine 101 in order to, among other benefits, reduce fuel consumption.

The engine stop/start control module 208 may also receive data indicative of ambient weather conditions and in response enable or disable the stop/start function. For example, external dynamic information indicates that the ambient temperature is 90 degrees Fahrenheit (or 50 degrees Fahrenheit) when the vehicle is at a temporarily stop. The engine stop/start control module 208 compares the ambient temperature to a predetermined set point for the heat, ventilating, air conditioning (HVAC) system. In response to determining that the ambient temperature is significantly higher (or lower) than the HVAC set point, the engine may need to stay on to keep the HVAC system working. As a result, the engine stop/start module 208 may disable the stop/start function.

Figure 3:
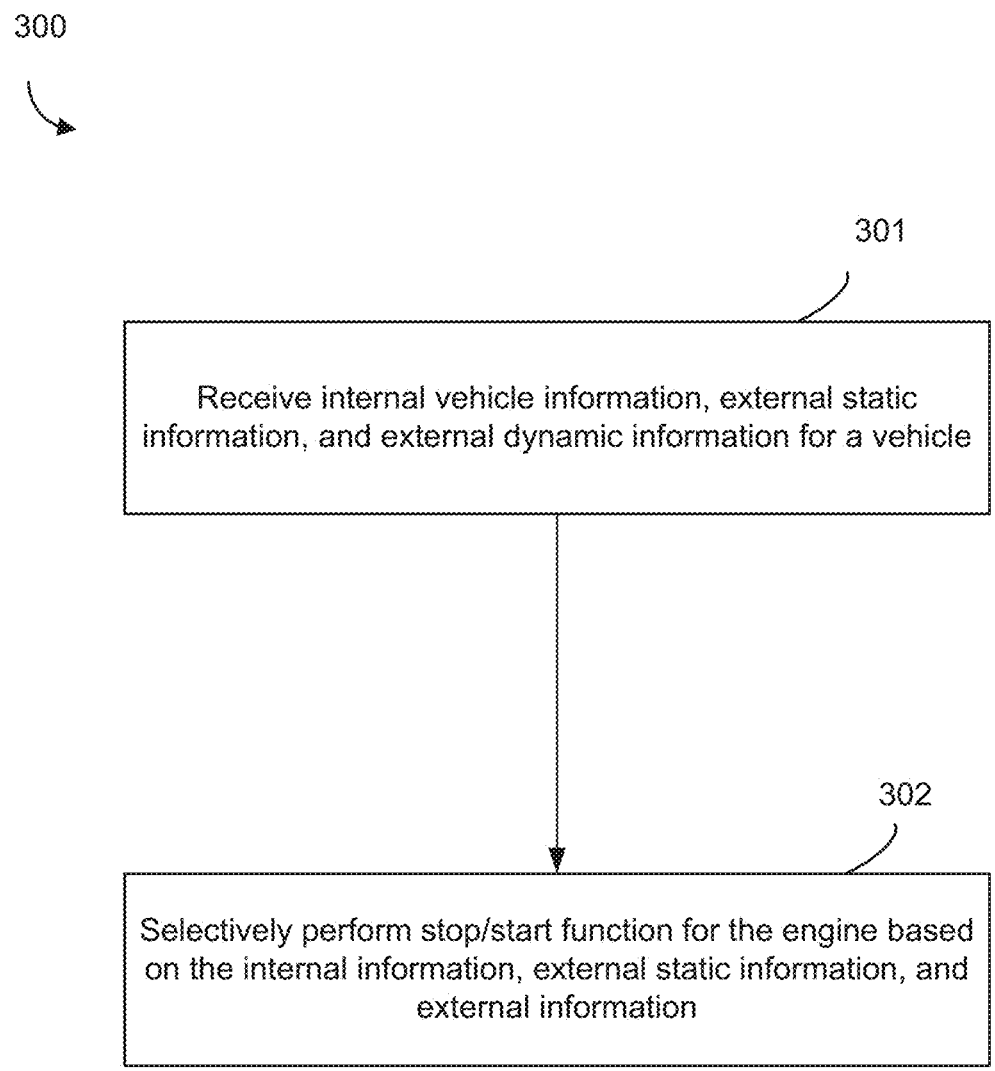
FIG. 3 is a flow diagram of a method of controlling the stop/start function for an engine in a vehicle, according to an example embodiment.

Referring now to FIG. 3, a flow diagram of a method of controlling a stop/start feature in a vehicle is shown according to one embodiment. Because method 300 may be implemented with the controller 150 and in the system 100, reference may be made to one or more features of the controller 150 and the system 100 to explain method 300.

At process 301, internal vehicle information, external static information, and external dynamic information for a vehicle is received. The interval vehicle information, external static information, and external dynamic information may have the same definition as described herein above. The information may be received by the controller 150. In another embodiment, at least some of the information may be acquired or facilitated to be acquired by the controller 150 (e.g., the controller 150 may command the road grade sensor to acquire data indicative of an instantaneous or near instantaneous road grade setting for the vehicle). As an example, the internal vehicle information may include an instantaneous road grade, the external static information may include an upcoming road grade or a turn, and the external dynamic information may include traffic conditions or ambient weather conditions.

At process 302, the engine stop/start control module 208 selectively enable and disable the stop/start function for the engine 101 of the hybrid vehicle 100 based on the internal vehicle information, external static information, and external dynamic information.

In particular, as discussed herein above, the engine stop/start control module 208 may disable the stop/start function if the instantaneous road grade exceeds a predetermined road grade threshold. The engine stop/start control module 208 may also disable the stop/start function at an upcoming uphill spot. The engine stop/start control module 208 may also disable the stop/start function if power steering will be needed for an upcoming turn. The engine stop/start control module 208 may also selectively enable or disable the stop/start function based on different traffic conditions, as discussed above. The engine stop/start control module 208 may also disable the stop/start function if the ambient temperature is significantly higher or lower than a HVAC set point.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete. components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
an internal information module structured to receive internal information regarding operation of a hybrid vehicle;
an external static information module structured to receive external static information for a route of the hybrid vehicle, wherein the external static information is based on a position of the hybrid vehicle on the route;
an external dynamic information module structured to receive external dynamic information for the route of the hybrid vehicle, wherein the external dynamic information is based on the position and a time of travel of the hybrid vehicle at the position; and
an engine stop/start module communicably coupled to each of the internal information module, the external static information module, and the external dynamic information module, wherein the engine stop/start module is structured to:
selectively enable and disable a stop/start function for the engine of the hybrid vehicle based on at least one of the internal information, the external static information, and the external dynamic information; and
disable the stop/start function for the engine if an instantaneous road grade exceeds a predetermined road grade threshold, wherein the stop/start function controls selective activation and deactivation of the engine during operation of the hybrid vehicle.

2. A system for a hybrid vehicle, comprising:
an engine; and
a controller communicably and operatively coupled to the engine, the controller structured to:
receive at least one of internal information, external static information, and external dynamic information;
selectively enable and disable a stop/start function for the engine based on at least one of the internal information, the external static information, and the external dynamic information;
disable the stop/start function for the engine if an instantaneous road grade exceeds a predetermined road grade threshold, wherein the stop/start function controls selective activation and deactivation of the engine.

3. The apparatus of claim 1, wherein the external static information includes at least one of GPS location and map-based database, wherein the engine stop/start module is further structured to determine an upcoming road grade based on the at least one of GPS location and map-based database, and to disable the stop/start function for the engine if the upcoming road grade exceeds a predetermined road grade threshold.

4. The apparatus of claim 1, wherein the external static information includes at least one of a GPS information and a map-based database, wherein the engine stop/start module is further structured to determine an upcoming turn based on the at least one of the GPS information and the map-based database, and to disable the stop/start function for the engine if a power steering requirement is needed for the upcoming turn.

5. The apparatus of claim 1, wherein the external dynamic information includes traffic conditions.

6. The apparatus of claim 1, wherein the external dynamic information includes an ambient temperature, and wherein the engine stop/start module is further structured to disable the stop/start function based on a difference between the ambient temperature and a set point of a HVAC exceeding a predetermined threshold.

7. A method, comprising:
receiving, by a controller of a hybrid vehicle, internal hybrid vehicle information, external static information, and external dynamic information;
selectively enabling or disabling a stop/start function for an engine of the hybrid vehicle based on at least one of the internal hybrid vehicle information, the external static information, and the external dynamic information; and
disabling the stop/start function for the engine if an instantaneous road grade exceeds a predetermined road grade threshold, wherein the stop/start function controls selective activation and deactivation of the engine during operation of the hybrid vehicle.

8. The system of claim 2, further comprising a telematics unit and a motor/generator, wherein each of the motor/generator and the telematics unit are coupled to the controller.

9. The method of claim 7, wherein the external static information includes at least one of a GPS information and a map-based database, wherein the method further comprises:
- determining, by the controller of the hybrid vehicle, an upcoming road grade based on the at least one of the GPS information and the map-based database; and
- disabling the stop/start function for the engine at each location where the upcoming road grade exceeds the predetermined road grade threshold.

10. The method of claim 7, wherein the external static information includes at least one of a GPS information and a map-based database, and the method further comprising:
- determining, by the controller of the hybrid vehicle, an upcoming turn based on the at least one of the GPS information and the map-based database; and
- disabling the stop/start function for the engine responsive to a power steering requirement determined to be needed for the upcoming turn.

11. The method of claim 7, wherein the external dynamic information includes traffic conditions.

12. The method of claim 7, wherein the external dynamic information includes an ambient temperature, and wherein said disabling includes disabling the stop/start function for the engine based on a difference between the ambient temperature and a set point of a HVAC exceeding a predetermined threshold.

13. The system of claim 2, wherein the external dynamic information includes traffic conditions.

14. The system of claim 2, wherein the external dynamic information includes ambient temperature, and wherein the controller is further structured to disable the stop/start function based on a difference between the ambient temperature and a set point of a HVAC exceeding a predetermined threshold.

15. The system of claim 2, wherein the external static information includes at least one of a GPS information and a map-based database, wherein the engine stop/start module is further structured to determine an upcoming road grade based on the at least one of the GPS information and the map-based database, and to disable the stop/start function for the engine if the upcoming road grade exceeds the predetermined road grade threshold.

16. The system of claim 2, wherein the external static information includes at least one of a GPS information and a map-based database, wherein the engine stop/start module is further structured to determine an upcoming turn based on the at least one of the GPS information and the map-based database, and to disable the stop/start function for the engine if a power steering requirement is needed for the upcoming turn.

* * * * *